United States Patent
Min et al.

(10) Patent No.: US 10,576,558 B2
(45) Date of Patent: Mar. 3, 2020

(54) DEVICE FOR NOTCHING A SECONDARY BATTERY MANUFACTURED USING THE SAME

(71) Applicant: LG CHEM, LTD., Seoul (KR)

(72) Inventors: Ki Hong Min, Gwacheon-si (KR); Sung Min Hwang, Cheongju-si (KR); Jihoon Cho, Daejeon (KR); Taeyoon Jung, Cheongwon-gun (KR); Jeong Sam Son, Cheongju-si (KR); Changmin Han, Cheongju-si (KR); Jae Hoon You, Cheongju-si (KR); Su Taek Jung, Cheongju-si (KR); Hyeong Kim, Daegu (KR); Hyun-sook Baik, Cheongju-si (KR); Ki Hun Song, Hwaseong-si (KR); Sang Hyuck Park, Suwon-si (KR); Han Sung Lee, Incheon (KR); Byeong Geun Kim, Anyang-si (KR)

(73) Assignee: LG Chem, Ltd., Seoul (KR)

( * ) Notice: Subject to any disclaimer, the term of this patent is extended or adjusted under 35 U.S.C. 154(b) by 448 days.

(21) Appl. No.: 13/901,989

(22) Filed: May 24, 2013

(65) Prior Publication Data

US 2013/0252072 A1   Sep. 26, 2013

Related U.S. Application Data

(63) Continuation of application No. PCT/KR2011/008472, filed on Nov. 8, 2011.

(30) Foreign Application Priority Data

Dec. 2, 2010 (KR) .................. 10-2010-0122330

(51) Int. Cl.
  *B23D 33/02* (2006.01)
  *B21D 28/10* (2006.01)
  (Continued)

(52) U.S. Cl.
  CPC .............. *B23D 33/02* (2013.01); *B21D 28/10* (2013.01); *B21D 43/10* (2013.01); *H01M 4/04* (2013.01);
  (Continued)

(58) Field of Classification Search
  CPC ........ H01M 10/00; H01M 4/02; B23D 33/02; B21D 28/10; B21D 43/10
  (Continued)

(56) References Cited

U.S. PATENT DOCUMENTS 4,553,418 A   11/1985   Stoehr
4,881,883 A   11/1989   Michimoto et al.
(Continued)

FOREIGN PATENT DOCUMENTS

CN   101095252 A   12/2007
JP   5-64166 U   8/1993
(Continued)

OTHER PUBLICATIONS

Translation of JP H10328767.*
(Continued)

*Primary Examiner* — Ula C Ruddock
*Assistant Examiner* — Thomas H. Parsons
(74) *Attorney, Agent, or Firm* — Mintz Levin Cohn Ferris Glovsky and Popeo, P.C.; Steven M. Jensen

(57) ABSTRACT

Disclosed is a device for notching, at an interval of a unit electrode, a continuous electrode sheet in which an electrode active material is applied to one or both surfaces thereof, to form a plurality of unit electrodes from the electrode sheet, the device including a press to press notches on the top and the bottom of the electrode sheet at a set position, and two or more grippers arranged at the rear of the press based on a feed direction of the electrode sheet, the grippers drawing and transporting the electrode sheet by one pitch, a size
(Continued)

corresponding to the unit electrode according to operation of the press, wherein while one of the grippers draws and transports the electrode sheet, the remaining grippers move to a position for drawing.

12 Claims, 6 Drawing Sheets

(51) Int. Cl.
    *B21D 43/10*     (2006.01)
    *H01M 4/04*     (2006.01)
    *H01M 10/052*     (2010.01)
    *H01M 4/139*     (2010.01)

(52) U.S. Cl.
    CPC .......... *H01M 4/139* (2013.01); *H01M 10/052* (2013.01); *H01M 2220/20* (2013.01); *Y02E 60/122* (2013.01); *Y02P 70/54* (2015.11); *Y10T 83/647* (2015.04); *Y10T 83/664* (2015.04)

(58) Field of Classification Search
    USPC .......................................................... 429/209
    See application file for complete search history.

(56) References Cited

U.S. PATENT DOCUMENTS

| | | | | |
|---|---|---|---|---|
| 7,081,142 B1 * | 7/2006 | Carlson | ............... | H01M 2/1686 29/623.5 |
| 7,967,594 B2 * | 6/2011 | Tazoe | .................. | H01M 4/0435 425/363 |
| 2002/0035903 A1 | 3/2002 | Sato et al. | | |
| 2010/0024203 A1 | 2/2010 | Kim et al. | | |
| 2010/0068627 A1 * | 3/2010 | Muraoka | .................. | H01M 2/14 429/232 |
| 2011/0131799 A1 * | 6/2011 | Ito | ........................... | H01M 4/04 29/623.1 |

FOREIGN PATENT DOCUMENTS

| | | | | |
|---|---|---|---|---|
| JP | 2529959 B2 | | 9/1996 | |
| JP | 9-63578 A | | 3/1997 | |
| JP | 9-63591 A | | 3/1997 | |
| JP | 10-328767 A | | 12/1998 | |
| JP | 10328767 | * | 12/1998 | |
| JP | 10328767 A | * | 12/1998 | |
| JP | 2001167757 A | * | 6/2001 | |
| JP | 2002-126828 A | | 5/2002 | |
| JP | 2002301516 | * | 10/2002 | |
| JP | 2002-343350 A | | 11/2002 | |
| JP | 2002343350 | * | 11/2002 | |
| JP | 2003-275833 A | | 9/2003 | |
| JP | 2004-259626 A | | 9/2004 | |
| JP | 2008-37512 A | | 2/2008 | |
| KR | 10-2004-0079528 A | | 9/2004 | |
| KR | 10-2006-0080092 A | | 7/2006 | |
| KR | 1020060080092 | * | 7/2006 | ............. H01M 4/04 |
| KR | 10-2006-0099141 A | | 9/2006 | |
| KR | 10-2007-0007210 A | | 1/2007 | |
| KR | 10-2007-0007522 A | | 1/2007 | |
| KR | 10-2007-0064764 A | | 6/2007 | |
| KR | 10-2008-0058772 A | | 6/2008 | |
| TW | 548168 B | | 8/2003 | |
| WO | WO 2006/080045 A1 | | 8/2006 | |
| WO | WO2010026784 | * | 3/2010 | ............ H01M 10/04 |

OTHER PUBLICATIONS

Translation of JP 2001167757.*
International search report issued in PCT/KR2011/008472 dated Jun. 25, 2012.
Chinese Office Action (with English translation) dated Jan. 14, 2015.

* cited by examiner

DEVICE FOR NOTCHING A SECONDARY BATTERY MANUFACTURED USING THE SAME

TECHNICAL FIELD

The present invention relates to a novel device for notching. Specifically, the present invention relates to a device for notching, at an interval of a unit electrode, a continuous electrode sheet in which an electrode active material is applied to one or both surfaces thereof, to form a plurality of unit electrodes from the electrode sheet, the device comprising a press to press notches on the top and the bottom of the electrode sheet at a set position, and two or more grippers that are arranged at the rear of the press based on a feed direction of the electrode sheet and draw and transport the electrode sheet by one pitch, a size corresponding to the unit electrode according to operation of the press, wherein, when one of the grippers draws and transports the electrode sheet, the remaining grippers move to a position for drawing.

BACKGROUND ART

Recently, rechargeable secondary batteries are widely used as energy sources or auxiliary power devices of wireless mobile devices. In addition, secondary batteries are drawing great attraction as power sources of electric vehicles (EVs), hybrid electric vehicles (HEVs), plug-in hybrid electric vehicles (PHEVs) and the like suggested as alternatives to solve air pollution caused by conventional gasoline vehicles, diesel vehicles and the like using fossil fuels.

Such a secondary battery is manufactured in a state in which an electrode assembly is mounted in a battery case together with an electrolyte solution. Depending on manufacturing method, the electrode assembly is divided into a stack-type, a folding-type, a stack-folding type and the like. In the case of the stack type or stack-folding type electrode assembly, a unit assembly has a structure in which a cathode and an anode are laminated in this order such that a separator is interposed therebetween. In order to manufacture such an electrode assembly, manufacture of a cathode and an anode is first required.

That is, in order to manufacture a unit electrode such as a cathode and anode, first, a process for notching a continuous electrode sheet, in which an electrode active material is applied to one or both surfaces thereof, at an interval of a unit electrode, is required. The notching process is generally carried out by notching a part of the electrode sheet using a press.

The press apparatus is an apparatus for processing an electrode sheet, a material to be pressed, in the form of a predetermined shape and processing is generally carried out in a continuous feeding manner.

Such a continuous feeding manner is a method in which a press simultaneously transports and presses the electrode sheet, and is characterized in that the pressed electrode sheet is continuously fed without stop.

Describing this continuous feeding manner with reference to FIG. 1, the apparatus includes a press 20 to press an electrode sheet 10 in the form of a predetermined shape and a feeder 30 to feed the electrode sheet 10 to the press 20, and the press 20 also serves as a feeder. That is, the press 20 presses the electrode sheet 10 and, at the same time, transports half of a transport length, and the stand-by feeder 30 continuously transports the electrode sheet 10 in a state that the feeder 20 transports the remaining transport length. The electrode sheet 10 is continuously transported at a predetermined rate.

However, such a continuous feeding manner can feed the electrode sheet 10 at a predetermined rate, thus enabling stable pressing of the press 20, but, since it is difficult to feed the electrode sheet at a high rate due to inertia of a mold 22 that moves together with the press 10 when the press 10 moves left and right, a problem of deterioration in production efficiency occurs, thus resulting in increase in costs.

Accordingly, there is a need for development of a novel notching device to solve these problems.

DISCLOSURE

Technical Problem

Therefore, the present invention has been made to solve the above problems and other technical problems that have yet to be resolved.

It is one object of the present invention to provide a notching device for stably forming notches on an electrode sheet at a high rate.

It is another object of the present invention to provide a secondary battery that exerts superior operational properties using the notching device.

Technical Solution

In accordance with one aspect of the present invention, provided is a device for notching, at an interval of a unit electrode, a continuous electrode sheet in which an electrode active material is applied to one or both surfaces thereof, to form a plurality of unit electrodes from the electrode sheet, the device including: a press to press notches on the top and the bottom of the electrode sheet at a set position; and two or more grippers arranged at the rear of the press based on a feed direction of the electrode sheet, the grippers drawing and transporting the electrode sheet by one pitch, a size corresponding to the unit electrode according to operation of the press, wherein while one of the grippers draws and transports the electrode sheet, the remaining grippers move to a position for drawing.

That is, the notching device according to the present invention has a configuration in which grippers arranged at the rear of the press draw the electrode sheet by one pitch and the press only presses the electrode sheet transported by operation of the grippers, thereby rapidly forming notches on the electrode, as compared to a conventional configuration in which a press also performs transport.

In a preferred embodiment, the grippers may include a first gripper adjacent to the press and a second gripper arranged at the rear of the first gripper to alternately draw the electrode sheet. Such a gripper including the two grippers will also be broadly referred to as a "dual gripper".

Specifically, operation of the dual gripper is as follows. While the first gripper draws the electrode sheet from the press and transports the same, the second gripper returns to the position for drawing and starts to transport the electrode sheet from the press immediately after transport of the first gripper is finished.

The notches are formed on the top and the bottom of the electrode sheet, respectively, such that the notches are symmetrical to each other. For this reason, the notches can be easily cut during the subsequent cutting process.

Based on this configuration, a pressing rate of the press is for example 150 to 300 SPM (strokes per minute), which is increased, as compared to a conventional press also serving as a feeder. For example, the press serving as both a feeder and a presser has a pressing rate of 100 SPM or less.

The press may include a mold having at least two cavities to form a plurality of notches by one pressing operation. In this case, production efficiency can be improved.

Preferably, the mold has four to six cavities. The press including such a mold can form 4 to 6 notches through one pressing operation and the notch may have a shape such as a tap.

In some cases, the press may press notches between line units such that the electrode sheet is divided into two or more line units in a movement direction thereof and two or more unit electrodes are formed at respective line units at one pitch. In this case, the notch may be formed at the top and the bottom of the electrode sheet divided at respective lines and can improve production efficiency 2 times, as compared to an electrode sheet not divided at line units.

In a preferred embodiment, the notching device may further include a tension portion to apply back tension to the electrode sheet at the rear of the press in a direction opposite to the transport direction of the gripper.

The tension portion may include a roller set to be rotatable and a motor axially connected to the roller, wherein the motor synchronizes with the gripper.

In this case, the motor stops operation at a point 5 to 10 mm in front of where the gripper stops. As a result, the electrode sheet slips together with the roller and thus applies back tension to the electrode sheet.

The tension portion may include a roller to transport the electrode sheet, and a powder brake or a torque limiter to stop the roller.

Specifically, the powder brake or torque limiter stands the roller to apply back tension to the electrode sheet before the gripper completes transport of the electrode sheet to the press.

The notching device may have a structure in which an unwinder winding the electrode sheet and a meandering controller to control meandering of the electrode sheet are arranged at the front of the tension portion in this order.

In this case, the device may further include a tension-maintaining module arranged between the meandering controller and the tension portion, to maintain predetermined tension to the electrode sheet, together with the unwinder.

Such a tension-maintaining module may be composed of either a weight dancer or an air dancer.

In some cases, the notching device may further include an inspector to inspect the electrode sheet notched by the press at the rear of the gripper.

In this case, the inspector may include a camera to obtain an image data from the pressed electrode sheet and a decision module to analyze the image data.

Meanwhile, the electrode sheet may include a tap. This tap may be formed together with the notch in the notching process.

The present invention also provides an electrode assembly manufactured using the notching device.

The electrode assembly has a structure in which a cathode and an anode are laminated in this order such that a separator is interposed therebetween.

For example, the cathode is produced by applying a slurry prepared by mixing a cathode mixture containing a cathode active material with a solvent such as NMP, to a cathode current collector, followed by drying and rolling.

The cathode mixture may further optionally contain a component such as a conductive material, a binder or a filler in addition to the cathode active material.

The cathode active material is, as a substance that causes electrochemical reactions, a lithium transition metal oxide comprising two or more transition metals and examples thereof include, but are not limited to, layered compounds such as lithium cobalt oxide ($LiCoO_2$) or lithium nickel oxide ($LiNiO_2$) substituted with one or more transition metals; lithium manganese oxide substituted with one or more transition metals; lithium nickel oxide represented by the formula of $LiNi_{1-y}M_yO_2$ (in which M=Co, Mn, Al, Cu, Fe, Mg, B, Cr, Zn or Ga, the lithium nickel oxide including one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula of $Li_{1+x}M_{1-y}M'_yPO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The cathode current collector is generally manufactured to have a thickness of 3 to 500 μm. Any cathode current collector may be used without particular limitation so long as it has suitable conductivity without causing adverse chemical changes in the manufactured battery. Examples of the cathode current collector include stainless steel, aluminum, nickel, titanium, sintered carbon, and aluminum or stainless steel surface-treated with carbon, nickel, titanium or silver. These current collectors include fine irregularities on the surface thereof so as to enhance adhesion to electrode active materials. In addition, the current collectors may be used in various forms including films, sheets, foils, nets, porous structures, foams and non-woven fabrics.

For example, the anode is produced by applying a slurry prepared by mixing an anode mixture containing an anode active material with a solvent such as NMP to an anode current collector, followed by drying. The anode mixture may further optionally contain a component such as a conductive material, a binder or a filler as mentioned above.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The anode current collector is generally fabricated to have a thickness of 3 to 500 µm. Any anode current collector may be used without particular limitation so long as it has suitable conductivity without causing adverse chemical changes in the battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collectors, the anode current collectors include fine irregularities on the surface thereof so as to enhance adhesion to electrode active materials. In addition, the current collectors may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both a separator and an electrolyte.

The present invention also provides a secondary battery having a structure in which the electrode assembly is sealed together with the lithium salt-containing non-aqueous electrolyte solution in a battery case.

The lithium salt-containing, non-aqueous electrolyte is composed of a non-aqueous electrolyte and a lithium salt and examples of preferred electrolytes include non-aqueous organic solvents, organic solid electrolytes, inorganic solid electrolytes and the like.

Examples of the non-aqueous solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate. Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like.

The battery case may be a cylindrical can, a rectangular can or a pouch to which a lamination sheet is thermally bonded. Of these, the pouch-shaped case may be generally used due to advantages such as low weight, low manufacturing cost and easy shape change.

The laminate sheet includes an inner resin layer in which thermal bonding is performed, a barrier metal layer, and an outer resin layer that exerts durability.

The outer resin layer should have superior resistance to exterior environments, thus requiring a predetermined level or more of tensile strength and weather resistance. In this regard, a polymer resin for the outer coating layer may contain polyethylene naphthalate (PEN), polyethylene terephthalate (PET) or oriented nylon that exhibit superior tensile strength and weather resistance.

In addition, the outer coating layer is made of polyethylene naphthalate (PEN) and/or is provided at the outer surface thereof with a polyethylene terephthalate (PET) layer.

Polyethylene naphthalate (PEN) exhibits superior tensile strength and weather resistance even at a small thickness as compared to polyethylene terephthalate (PET) and is thus suitable for use as an outer coating layer.

The polymer resin for the inner resin layer may be a polymer resin that has a thermal bonding property (thermal adhesion property), low hygroscopicity of the electrolyte solution to prevent permeation of the electrolyte solution thereinto and is not expanded or deposited by the electrolyte solution and is more preferably a chlorinated polypropylene (CPP) film.

In a preferred embodiment, the laminate sheet according to the present invention may include an outer coating layer having a thickness of 5 to 40 µm, a barrier layer having a thickness of 20 to 150 µm, and an inner sealant layer having a thickness of 10 to 50 µm. When the thicknesses of respective layers of the laminate sheet are excessively small, barrier performance of the materials and improvement in strength cannot be expected and, on the other hand, when the thicknesses are excessively large, disadvantageously, processability is deteriorated and thicknesses of sheets are increased.

Such a secondary battery may be used for a battery cell used as a power source of small devices as well as a unit battery for middle and large battery modules including a plurality of battery cells used as power sources of middle and large devices requiring high-temperature stability, long cycle characteristics and high rate characteristics and the like.

Examples of preferred middle and large devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts; electric power storage system and the like.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustrating the present invention and should not be construed as limiting the scope and spirit of the present invention.

Figure 1:
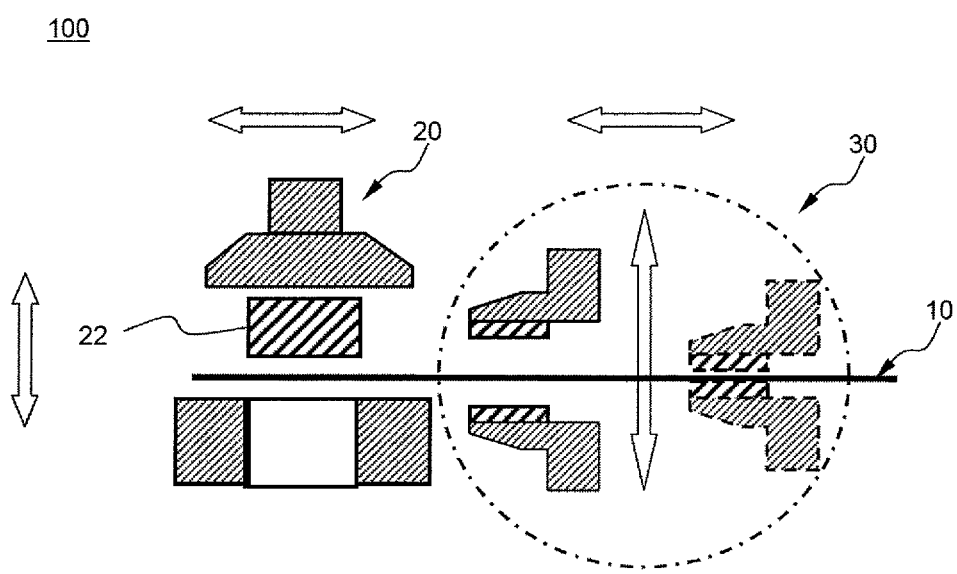
FIG. 1 is a partial schematic view illustrating a conventional notching device.
Figure 2:
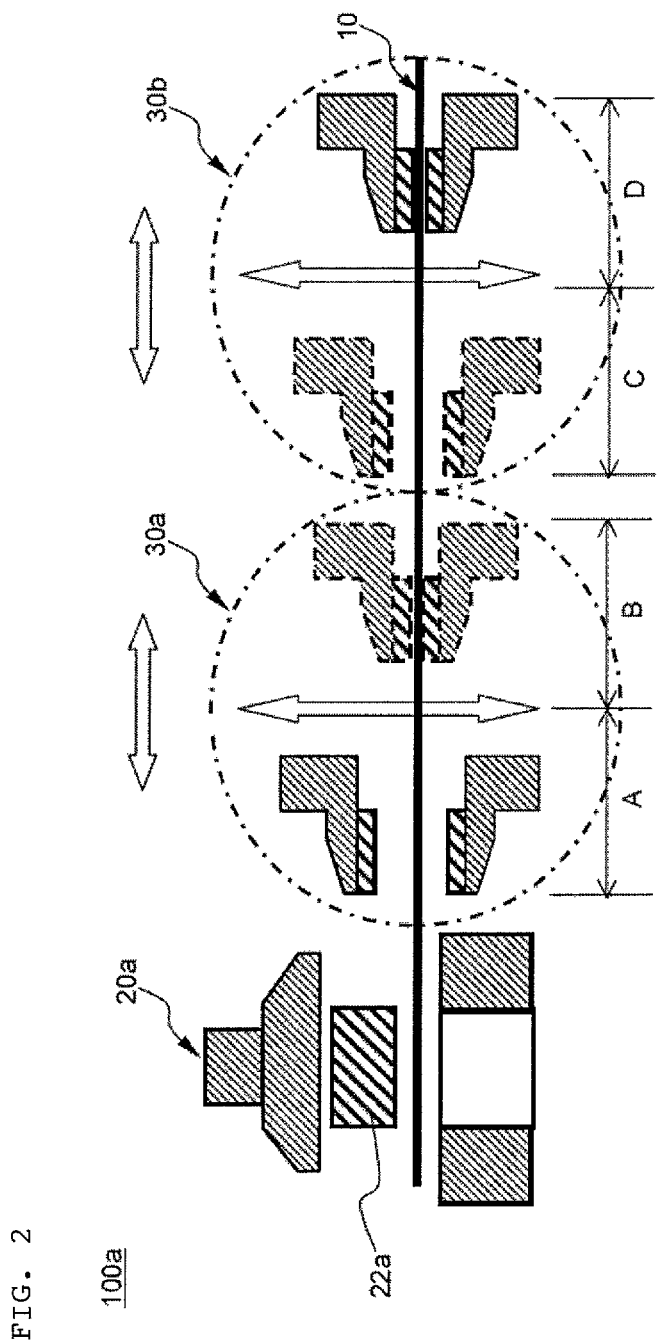
FIG. 2 is a partial schematic view illustrating a notching device according to one embodiment of the present invention.
Figure 3:
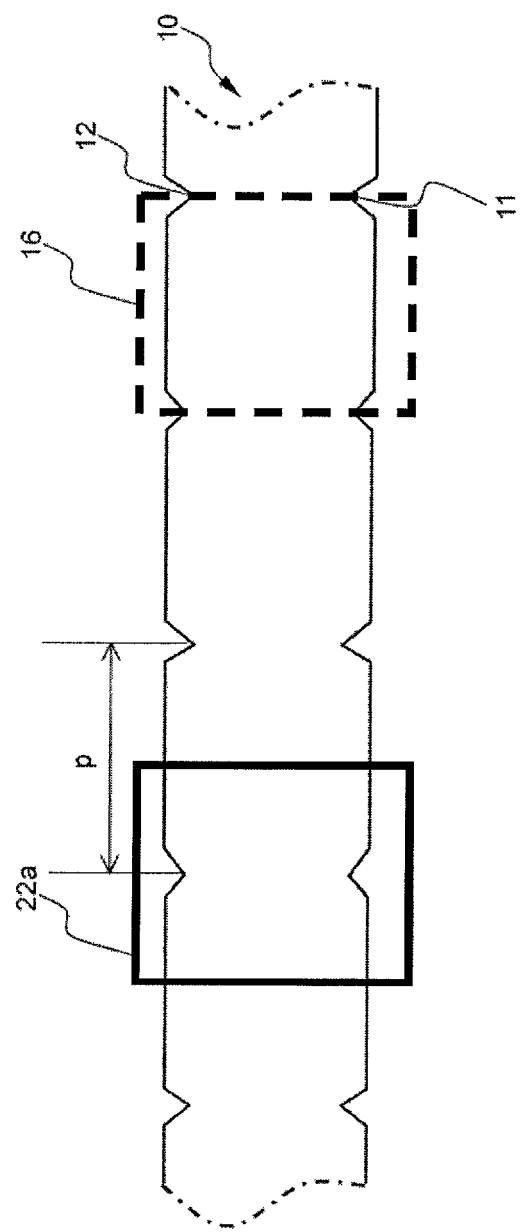
FIG. 3 is a plane schematic view illustrating the electrode sheet of FIG. 2.

FIG. 2 is a partial schematic view of a notching device according to one embodiment of the present invention. FIG. 3 is a plane schematic view of the electrode sheet of FIG. 2.

Referring to these drawings, a notching device 100a notches, at an interval of an unit electrode 16, a continuous electrode sheet 10 in which an electrode active material is applied to both surfaces thereof, to manufacture a plurality of unit electrodes 16 from the continuous electrode sheet 10.

In addition, the notching device 100a includes a press 20a that presses respective notches 11 and 12 on the top and the bottom of the electrode sheet 10 at a set position, and a first gripper 30a and a second gripper 30b of a dual gripper structure that draw and transport the electrode sheet 10 by one pitch (p), a size corresponding to the unit electrode 16 according to the operation of the press 20a.

The first gripper 30a and the second gripper 30b are arranged at the rear side of the press 20a based on the feed direction of the electrode sheet 10, and when the first gripper 30a draws and transports the electrode sheet 10, the second gripper 30b moves to the position for drawing.

Specifically, while the first gripper 30a draws the electrode sheet 10 from the press 20a and transports the same to a position of B, the second gripper 30b returns to a position of C for drawing and transports the electrode sheet 10 from the press 20a consecutively from the position of B at which transport of the first gripper 30a is completed.

The notches 11 and 12 are formed by the press 20a on the top and the bottom of the electrode sheet 10 such that they are symmetrical to each other.

In addition, the press 20a includes a mold 22a, thus pressing the electrode sheet 10 to form notches 11 and 12, and only presses the electrode sheet 10 in a set state.

Meanwhile, the press 20a synchronizes with the first gripper 30a and second gripper 30b. That is, while the press 20a stops, the first gripper 30a and the second gripper 30b draw the electrode sheet 10 by one pitch (p) and feed the electrode sheet 10 to the press 20a, and while the press 20a presses, operations thereof are stopped.

In addition, the first gripper 30a and the second gripper 30b feed the electrode sheet 10 to the press by one pitch (p) by a drawing operation in a state of gripping the electrode sheet 10. The first gripper 30a and the second gripper 30b alternately operate. That is, while the first gripper 30a operates, moves from the position 'A' to the position 'B' and feeds the electrode sheet 10 by one pitch, the second gripper 30b returns from the position 'D' to the position 'C' (standby position) and is arranged so that it feeds the electrode sheet 10 successively (immediately) from the first gripper 30a.

When the operation of first gripper 30a is finished, that is, when the first gripper 30a moves to the position 'B', completes feeding and the press 20a presses the notches, the second gripper 30b grips the electrode sheet 10 to prepare for feeding and, the second gripper 30b moves from the position 'C' to the position 'D' and successively feeds the electrode sheet 10 immediately after pressing via the press 20a is finished.

Such a configuration in which two grippers 30a and 30b are used prevents intermittent feeding from occurring, as occurs when one gripper is used, while the gripper feeds the electrode sheet 10 and then returns to the original position, and thus further improves production efficiency.

Figure 4:
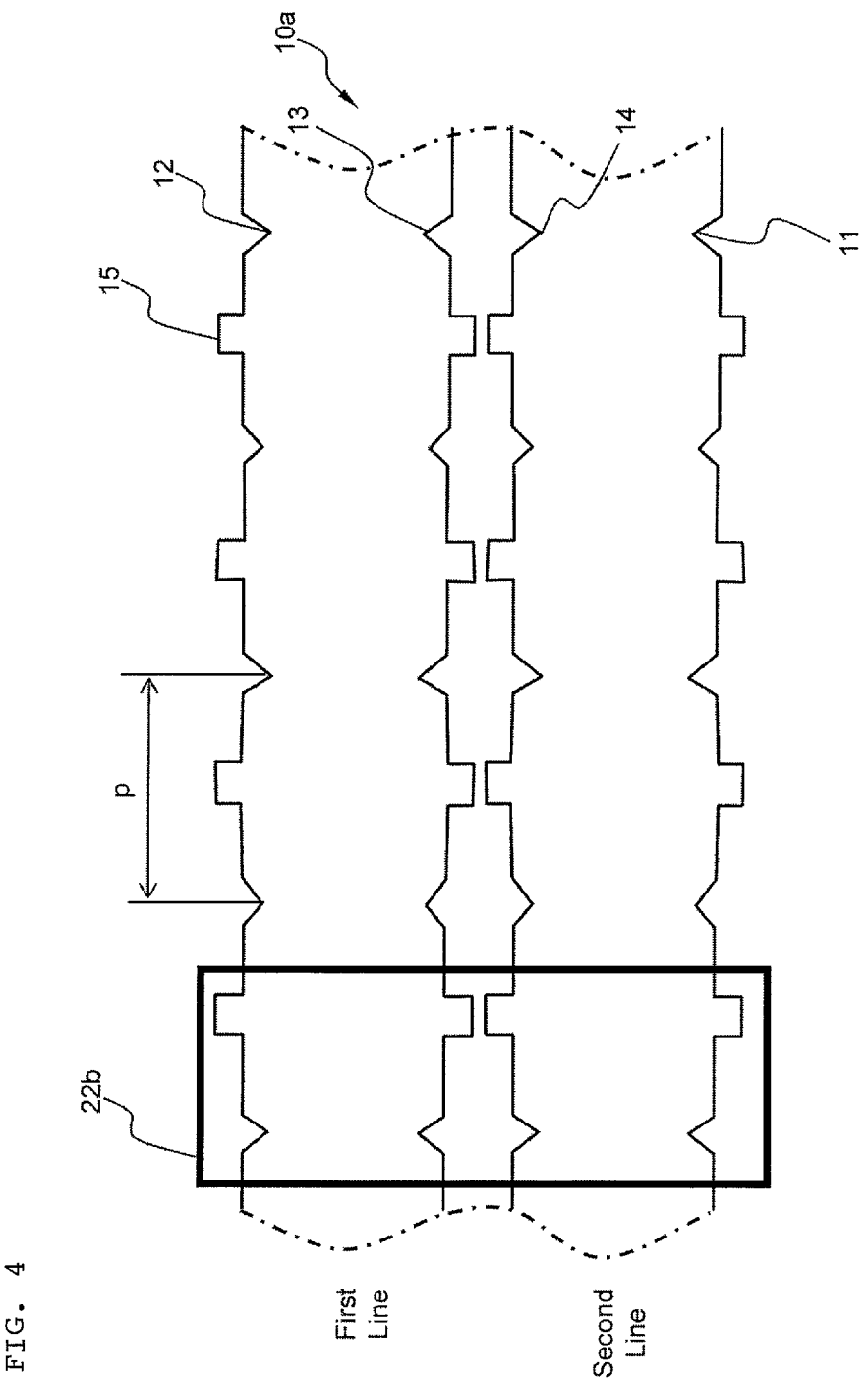
FIG. 4 is a plane schematic view illustrating an electrode sheet according to another embodiment of the present invention.

FIG. 4 is a plane schematic view illustrating an electrode sheet according to another embodiment of the present invention.

Referring to FIG. 4 together with FIG. 2, the press 20a presses notches 13 and 14 between a first line and a second line, and two unit electrodes are divided into two line units at one pitch (p) in a movement direction of the electrode sheet 10a and two unit electrodes are notched at respective line units in one pitch (p).

The press 20a includes a mold 22b having four pairs of cavities to form four taps 15 and notches 11, 12, 13 and 14 through a single pressing operation.

In addition, the press 20a forms four taps 15 in the process of forming the notches 11, 12, 13 and 14 on the electrode sheet 10a. These taps 15 are formed in a region of the electrode sheet 10a to which an electrode active material is not applied and have a symmetrical structure at respective unit lines of the electrode sheet 10a.

Figure 5:
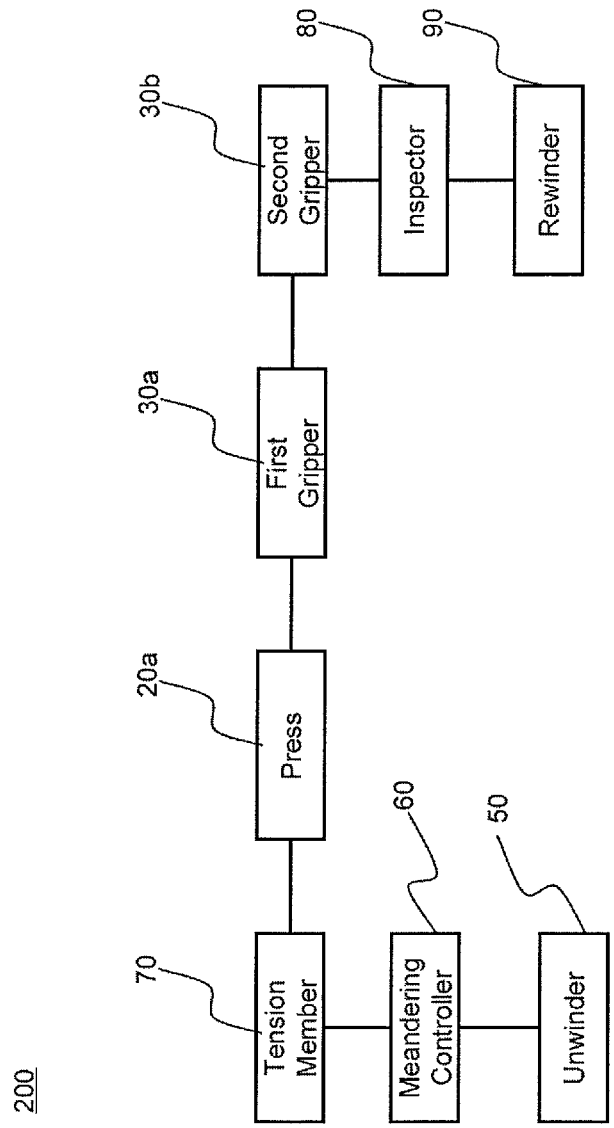
FIG. 5 is a schematic view illustrating a configuration of the notching device according to another embodiment of the present invention.
Figure 6:
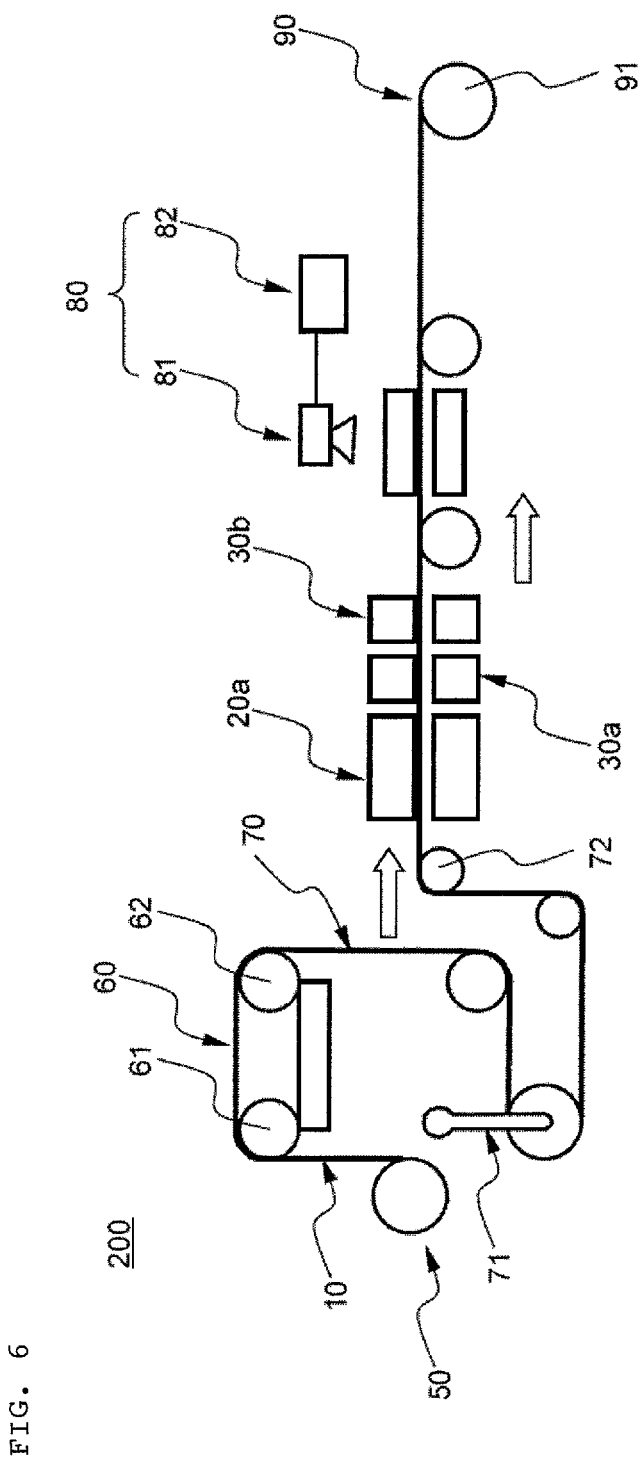
FIG. 6 is a schematic view illustrating a process of the notching device according to another embodiment of the present invention.

FIG. 5 is a schematic view illustrating a configuration of the notching device according to another embodiment of the present invention. FIG. 6 is a schematic view illustrating the process of FIG. 5.

Referring to these drawings together with FIGS. 2 and 3, a notching device 200 includes an unwinder 50, a meandering controller 60, a tension portion 70, a press 20a that presses notches 11 and 12 on the top and the bottom of an electrode sheet 10, a first gripper 30a and a second gripper 30b that draw the electrode sheet 10 and transport the same to the press 20a, an inspector 80 and a rewinder 90.

The tension portion 70 includes a tension-maintaining module 71 that applies back tension to the electrode sheet 10 at the front of the press 20a in a direction opposite to the transport direction of the first gripper 30a and the second gripper 30b and maintains predetermined tension of the electrode sheet 10.

In addition, the meandering controller 60 that controls meandering of the electrode sheet 10 is arranged between the unwinder 50 that winds the electrode sheet 10 and the tension portion 70 that applies back tension to the electrode sheet 10, and an inspector 80 that inspects the electrode sheet 10 on which the notches 11 and 12 are pressed is arranged at the rear of the second gripper 30b.

The rewinder 90 to rewind the inspected electrode sheet is arranged at the rear of the inspector 80, and the inspector 80 includes a camera 81 to obtain an image data from the notch-pressed electrode sheet and a decision module 82 to analyze the image data.

Specifically, the electrode sheet 10 to be pressed is wound on the roller of the unwinder 50, the roll of the unwinder 50 is axially connected to a servo motor, and the electrode sheet 10 is thus actively unwound depending on a control signal applied to the servo motor.

The meandering controller 60 prevents the electrode sheet 10 from meandering in the process of transporting the electrode sheet. A sensor (not shown) constituting the meandering controller 60 senses meandering of the electrode sheet 10 in the process of transporting the electrode sheet 10, thereby causing the first roll 61 and the second roll 62 constituting the meandering controller 60 to move in an axial direction and prevents the electrode sheet 10 from meandering. The electrode sheet 10 that is subjected to meandering control while passing through the meandering controller 60 is transported to the tension portion 70.

The tension portion 70 controls tension of the electrode sheet 10 at the front of the press 20a and thereby prevents the electrode sheet 10 from meandering, and the electrode sheet 10 that passes through the tension portion 70 is transported to the press 20a through an idler roller 72.

The press 20a presses a notch on the electrode sheet 10 according to the mold in a set position. Such an electrode sheet 10 is fed to the press 20a by a distance (p) between the notches 12 according to the operation of the first gripper 30a and the second gripper 30b and the distance is referred to as a "pitch (p)".

The first gripper 30a and the second gripper 30b draw the electrode sheet 10 and transport the same to the press 20a by one pitch according to the pressing rate of the press 20a.

The inspector 80 confirms whether pressing of the press 20a is within an acceptable error range through visual testing. The electrode sheet 10 passing through the inspector 80 is transported to the rewinder 90 and is wound on the roll 91.

If necessary, another tension portion (not shown) may be arranged between the inspector 80 and the rewinder 90 so that the tension portion 70 maintains the tension of the electrode sheet 10 at the rear of the press 20a and thereby enables the electrode sheet 10 to maintain a tight state.

In addition to these components, an apparatus to supply a protective material wound together with the pressed electrode sheet 10 may be added in order to protect the pressed electrode sheet 10 when the pressed electrode sheet 10 is wound on the roll of the rewinder 90.

In addition, the electrode sheet 10 is transported to the tension portion 70 in a state that meandering of the electrode sheet 10 is controlled by the meandering controller 60.

The press 20a presses the electrode sheet 10 at a set position, the first gripper 30a and the second gripper 30b draw the electrode sheet 10 at a high rate when pressing of the press 20a is finished, and feed the electrode sheet 10 to the press 20a again. Accordingly, the electrode sheet 10 jitters due to inertia since it rapidly moves and stops. This problem is solved by the tension portion 70.

The tension portion 70 includes a tension-maintaining module 71 and back tension module (not shown), and the tension-maintaining module 71 applies predetermined tension to the electrode sheet 10 transported to the press at the front of the press. A weight dancer serving as the tension-maintaining module 71 is axially connected to a pneumatic cylinder (not shown) and includes a potential meter (not shown) to measure a movement angle of the weight dancer.

The movement of the weight dancer 71 is measured by the potential meter and the unwinder 50 unwinds the material to a large or small extent (to a certain degree), based on the measured value and thereby maintains tension applied to the electrode sheet 10. More specifically, when the weight dancer 71 moves in a counterclockwise direction, the unwinder 50 increases a rotation rate of the servo motor, unwinds more material from the roll, and the weight dancer 71 is returned back by the force of the pneumatic cylinder and applies tension to the electrode sheet 10.

When the weight dancer 71 moves in a clockwise direction, the unwinder 50 reduces a rate of rotation of the servo motor and thereby unwinds less material and the weight dancer 71 returns to the original position and reduces tension applied to the electrode sheet 10.

As such, the weight dancer 71 synchronizes with the unwinder 50 and maintains predetermined tension of the electrode sheet 10 transported to the press 20a.

The back tension module (not shown) prevents meandering of the electrode sheet 10 caused by instantaneous operation of the gripper 30a and the second gripper 30b. This back tension module is arranged at the front of the press 20a and preferably includes a servo roller.

The servo roller is axially connected to the servo motor (not shown) and controls rotation of the servo roller using a control signal.

Such a servo roller is set such that it moves synchronously with the first gripper 30a and the second gripper 30b. That is, when the first gripper 30a and the second gripper 30b operate, the servo motor rotates the servo roller in a forward direction, and when the operations of the first gripper 30a and the second gripper 30b are finished, the servo motor stops and the servo roller stops rotation. Preferably, the servo motor stops at a point 5 to 10 mm in front of where the first gripper 30a and the second gripper 30b stop and thereby prevents the servo roller from rotating by inertia after the first gripper 30a and the second gripper 30b stop. As such, before the first gripper 30a and the second gripper 30b stop operation, that is, before transport of the electrode sheet 10 to the press 20a is finished, the serve motors stop rotation of the servo roller and prevent further drawing of the electrode sheet 10 using friction generated by slip between the electrode sheet 10 and the servo roller. As a result, the electrode sheet 10 is further drawn by the first gripper 30a and the second gripper 30b and uttering of the electrode sheet 10 caused by inertia can be thus solved.

The camera 81 may have any configuration so long as the configuration enables digital image data to be obtained, and preferably includes a camera using a charge-coupled device (CCD) with excellent image quality as an image sensor, and a decision module 82 decides whether or not pressing of the electrode sheet 10 is good according to an algorithm.

The electrode sheet 10 subjected to a pitch test in the inspector 80 is fed to the rewinder 90 through the rollers and the pressed electrode sheet is wound on the rewinder 90.

Meanwhile, a rear tension portion including a weight dancer and an air dancer to maintain tension of materials may further be present between the inspector 80 and the rewinder 90.

In addition, the meandering controller may further be present between the inspector 80 and the rewinder 90. In this case, the meandering controller prevents the electrode sheet 10 from meandering when the pressed material is wound on the roll again.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the notching device according to the present invention stably forms notches on an electrode sheet at a high rate and thereby greatly improves production efficiency of the overall process.

The invention claimed is:

1. A device for notching, at an interval of a unit electrode, a continuous electrode sheet in which an electrode active material is applied to one or both surfaces thereof, to form a plurality of unit electrodes from the electrode sheet, the device comprising:
    a press to press notches on the top and the bottom of the electrode sheet at a set position;
    two or more grippers arranged at rear of the press based on a feed direction of the electrode sheet, the grippers drawing and transporting the electrode sheet by one pitch by turns, a size corresponding to the unit electrode according to operation of the press; and
    a tension portion arranged in front of the press based on the feed direction of the electrode sheet to apply back tension to the electrode sheet in a direction opposite to the transport direction of the gripper,
    wherein the grippers are disposed on an opposite side from the tension portion with respect to the press to allow the press to press notches while the electrode sheet is maintained under a tension between the grippers and the tension portion,
    wherein the grippers comprise a first gripper adjacent to the press and a second gripper arranged at the rear of the first gripper to alternately draw the electrode sheet such that the first gripper is located between the press and the second gripper in the feed direction,
    wherein, the grippers are moveable towards and away from the press such that, while one of the grippers draws and transports the electrode sheet away from the press, the remaining grippers move towards the press to a position for drawing,
    wherein each of the first gripper and second gripper includes an upper member disposed above the electrode sheet and a lower member disposed below the electrode sheet,
    wherein the upper member and the lower member of the first and second grippers are movable normal to the electrode sheet and parallel to the electrode sheet, and
    wherein the press presses notches between the top and the bottom of the electrode sheet such that the electrode sheet is divided into two or more line units parallel to the transport direction and two or more unit electrodes are formed at respective line units at one pitch.

2. The device according to claim 1, wherein, while the first gripper draws the electrode sheet from the press and transports the same, the second gripper returns to the position for drawing and starts to transport the electrode sheet from the press immediately after transport of the first gripper is finished.

3. The device according to claim 1, wherein the notches are formed on the top and the bottom of the electrode sheet, respectively, such that the notches are symmetrical to each other.

4. The device according to claim 1, wherein the press comprises a mold having at least two cavities to form a plurality of notches by one pressing operation.

5. The device according to claim 4, wherein the mold has four to six cavities.

6. The device according to claim 1, wherein the tension portion comprises a roller set to be rotatable and a motor axially connected to the roller,
    wherein the motor synchronizes with the gripper.

7. The device according to claim 1, wherein the tension portion comprises a roller to transport the electrode sheet, and a powder brake or a torque limiter to stop the roller.

8. The device according to claim 1, wherein an unwinder winding the electrode sheet and a meandering controller to control meandering of the electrode sheet are arranged at the front of the tension portion in this order.

9. The device according to claim 1, further comprising: an inspector to inspect the electrode sheet notched by the press at the rear of the gripper.

10. The device according to claim 1, wherein the electrode sheet comprises a tap.

11. The device according to claim 1, further comprising an apparatus to supply a protective material wound together with the pressed electrode sheet in order to protect the pressed electrode sheet.

12. The device according to claim 1, wherein the tension portion has a tension-maintaining module to apply back tension to the electrode sheet at the rear of the press in the direction opposite to the transport direction of the gripper,
    wherein the tension portion comprises a roller set to be rotatable and a motor axially connected to the roller, and
    wherein the motor synchronizes with the gripper, the motor being configured to stop operation at a point 5 to 10 mm in front of where the gripper stops so that the electrode sheet slips together with the roller to apply back tension to the electrode sheet.

* * * * *